J. P. LAFETRA.
Road-Planer.
No. 213,210. Patented Mar. 11, 1879.
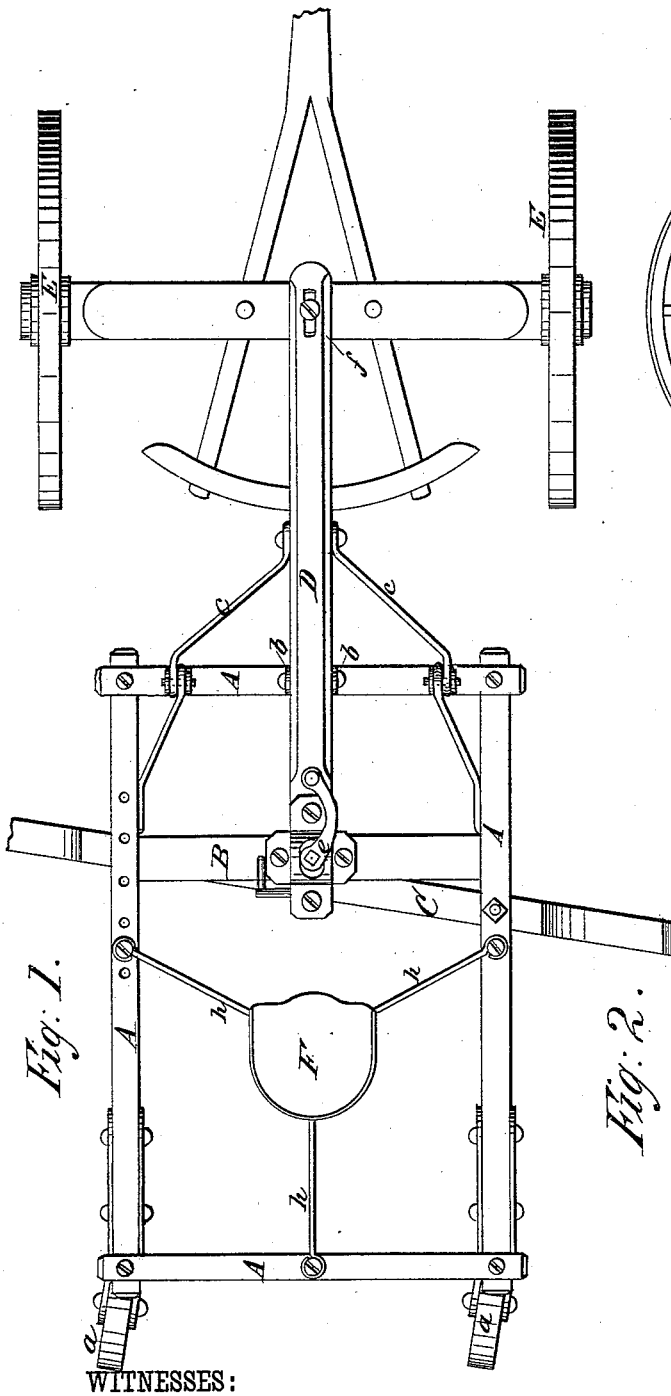
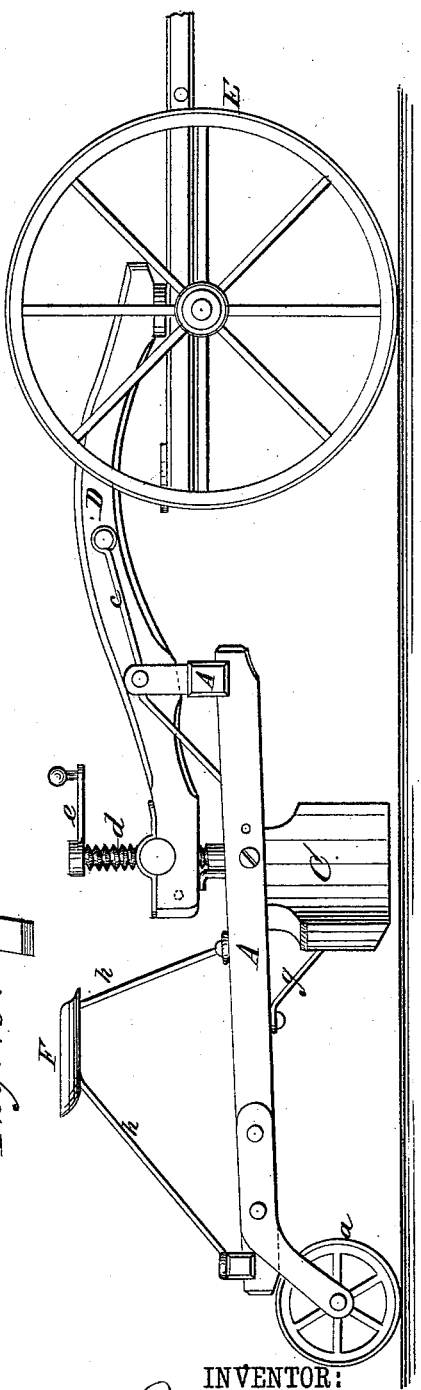

UNITED STATES PATENT OFFICE.

JOSEPH P. LAFETRA, OF SHREWSBURY, NEW JERSEY.

IMPROVEMENT IN ROAD-PLANERS.

Specification forming part of Letters Patent No. 213,210, dated March 11, 1879; application filed December 18, 1878.

*To all whom it may concern:*

Be it known that I, JOSEPH P. LAFETRA, of Shrewsbury, in the county of Monmouth and State of New Jersey, have invented a new and Improved Road-Planer, of which the following is a specification:

The object of this invention is to provide a simple, economical, and easily-operated implement for planing, leveling, and smoothing roadways, &c.

It consists of a knife or blade suspended diagonally from the under side of a rectangular frame supported at the rear on wheels, and at the front pivoted to a coupler or reach, one end whereof is connected with the planer-frame by an elevating and depressing screw, while the opposite end, when the implement is in use, is supported on the axle of the front wheels of an ordinary wagon.

In the accompanying drawings, Figure 1 is a plan of my improvement, and Fig. 2 is a side elevation of the same.

Similar letters of reference indicate corresponding parts.

Referring to the drawings, A represents a rectangular frame-work having near the front end a cross-bar, B. Just below the cross-bar B, to the under side of the frame, is secured by its upper edge in a diagonal position a planer-blade, C, the ends whereof extend beyond the side bars of the frame about one-quarter of its whole length. The object of fixing the planer to the frame in a diagonal position is to enable it to throw the dirt off to one side as the implement is drawn forward.

The rear end of the frame A is supported on wheels *a a*, pivoted at an angle of about two degrees to the length of the frame. This arrangement is adopted to overcome the tendency of the implement to move to the left from the direction of the resistance to the planer-blade. Thus the blade strikes the ground at an angle of about two degrees to a line transverse to the direction in which the whole machine moves, and this causes it to turn to the left, but the wheels *a* guide the frame in an opposite direction; hence between the two forces in opposition there is a resultant straight line.

D is a reach or coupling. It is pivoted to the front bar of the frame a short distance back of its middle line in jaws *b b*, and it is strengthened laterally by braces *c c*, so as to be rigidly connected with the frame. At its rear end the reach D is provided with a thread-hole, which is engaged by a vertical elevating and depressing screw, *d*, the lower end whereof is pivoted in the cross-bar B at its middle line, while the upper end, projecting through the threaded hole of the reach, is provided with a crank, *e*. By means of this screw the forward end of the frame A, and with it the planer-blade, can be raised and lowered for about the length of the screw, the reach turning on its pivot or fulcrum and raising the frame as its end is elevated by the screw. The opposite end of the reach is provided with a king-bolt hole slotted in its upper part, through which a king-bolt, *f*, is passed to connect it with the axle of the wheels E. The planer-blade is strengthened at the rear by braces *g*, reaching from the under side of frame A. From the upper side of frame A extend rods *h h h*, which support near the center of the frame a driver's seat, F, convenient to the crank *e*.

The operation of the invention is as follows: When the implement is to be transported from place to place the front of the frame is elevated by screwing down the screw *d*. This, as before described, raises the planer-blade from contact with the ground, and sufficiently far to enable it to pass over, without injury, stumps, railroad-tracks, and other obstructions; but when it is to be used the blade is lowered, so that as it is drawn forward it planes off the ground, throwing the earth off to the right.

By repeatedly passing over the ground, it can be planed down to any depth, and at the same time leveled, smoothed, and cleared of the material.

By placing the adjustment of the planer-blade entirely under the control of the elevating and depressing screw *d*, one man is all that is necessary to operate the machine, and he can at will, and without changing his position, adapt it to travel over obstructions or act upon a part of the road to be leveled.

Again, the rigid connections of the planer-blade, frame, and reach maintain the blade at the level to which it is adjusted by the screw, whereby it is permitted to act upon the elevated portions of the roadway without falling into the hollow, thus carrying the earth planed from the ridges and hillocks into the hollows and filling them. These features, the elevating and depressing screw and the rigid connection of the parts (maintaining the planer-blade at the point to which it is adjusted by the screw $d$) enable the machine to work more advantageously than any device now employed for scraping roads.

In its manufacture it may be made without the fore wheels, as these can be supplied from any ordinary wagon.

Having thus described my invention, I claim as new and desire to secure by Letters Patent—

1. As an improvement in road-planers, the elevating and depressing screw $d$, in combination with planer-blade C, frame A, and reach or coupler D, rigidly connected with frame A, substantially as described.

2. As an improvement in road-planers, the frame A, sustaining the planer-blade C, in combination with the reach D, pivoted to said frame, and vertically adjustable to raise and lower the blade C, substantially as described.

3. The reach D, pivoted or fulcrumed to front of frame A, and with its shorter end connected therewith by vertical screw $d$, in combination with frame A, planer-blade C, and elevating and depressing screw $d$, substantially as described.

4. The combination and arrangement of the following parts, to wit: the frame A, supported at the rear on wheels $a$, the planer-blade C, suspended from the under side of said frame, the reach D, pivoted to the front of said frame, and with its short end engaged by screw $d$, pivoted in cross-piece B, and screw $d$, for operating reach D, to elevate and depress the planer-blade C, substantially as described.

JOSEPH PRESTON LAFETRA.

Witnesses:
EZRA WOOLEY,
ROBERTSON SMITH.